United States Patent [19]

Riggs

[11] 3,774,213

[45] Nov. 20, 1973

[54] METHOD FOR DETERMINING THE CLOSEST POINT OF APPROACH

[75] Inventor: Robert F. Riggs, Charlottesville, Va.

[73] Assignee: The United States of America as represented by the Secretary of the Navy, Washington, D.C.

[22] Filed: June 8, 1959

[21] Appl. No.: 818,978

[52] U.S. Cl..... 343/112 D, 102/70.2 P, 343/12 MD
[51] Int. Cl............................................. G01s 11/00
[58] Field of Search.................. 343/113, 7, 12 MD, 343/112 D, 119, 123, 115, 816, 854

[56] References Cited
UNITED STATES PATENTS

| | | | |
|---|---|---|---|
| 2,424,982 | 8/1947 | Higgins et al. | 343/854 |
| 2,427,660 | 9/1947 | Colton et al. | 343/123 X |
| 2,825,057 | 2/1958 | Worthington, Jr. | 343/113 |

Primary Examiner—Benjamin A. Borchelt
Assistant Examiner—Richard E. Berger
Attorney—E. H. Marshall, J. M. St. Amand and Q. Baxter Warner

EXEMPLARY CLAIM

1. A radio fuze system for determining the closest point of approach of a missile to a target comprising a pair of stations for receiving radio signals from said target, means for comparing the phase relationship between said signals including means for algebraically adding said signals to produce an output, means for amplifying said output and means for deriving a firing signal for said fuze when said missile attains said closest point of approach; said amplifying means including means for amplifying the DC component of said output and said means for deriving a firing signal including means for deriving a first pulsed signal from said DC amplifying means output and means for deriving a second pulsed signal whereby said firing signal occurs only when said pulsed signals are derived simultaneously.

4 Claims, 4 Drawing Figures

INVENTOR.
ROBERT F. RIGGS

METHOD FOR DETERMINING THE CLOSEST POINT OF APPROACH

The invention described herein may be manufactured and used by or for the Government of the United States of America for governmental purposes without the payments of any royalties thereon or therefor.

This invention relates generally to a method of apparatus to determine the closest point of approach between a missile and a target. More particularly the invention relates to a device to determine the closest point of approach between a radio transmitter and the device when either the device or the transmitter or both are moving along straight line courses in order to determine when other devices such as warhead detonators are to be triggered.

One type of the prior CPA indicators, commonly referred to as the proximity fuze, transmits a radio signal which is reflected from targets or other objects in the near vicinity. The reflected signal is received and detected by the indicator and when the received signal reaches a certain predetermined amplitude the device triggers a warhead detonator. Another variation of this proximity fuze type CPA indicator is used to determine when an aircraft is directly above the geographical point. In this case the transmitter locator on the earth radiates radio energy in a vertical direction, the aircraft contains a receiver tuned to the frequency of the transmitter when the aircraft passes over the transmitter the received signal is used to trigger an indicating device such as the lightbulb in the cockpit. One other type of CPA indicator employs the doppler effect. In this type the apparent change in frequency of the received signal as a range between the transmitter and the receiver changes from a decreasing to an increasing range is used as an indicator. Such CPA indicators have been found to have certain disadvantages, for example, CPA indicators which use the amplitude of the received signal as the primary criteria for determining the CPA are subject to error due to variations in the reflectivity of the target when used as an active device. When used as a passive device variations in transmitter power, distance between the transmitter and receiver, receiver sensitivity, and antenna patterns all tend to cause uncertainties in the determinations of the CPA. Furthermore, the type which used Doppler effect to determine the CPA is much more complicated to design, construct and maintain since it does not normally lend itself to application where available space is limited such as in guided missles or projectiles.

The present invention comprises a closest point of approach indicator for fuzing system which can be used either as a passive fuzing system against a transmitter located on a surface vessel or the earth or as an active system wherein the missile in which the instant invention is incorporated radiates electromagnetic energy and a reflection is received from a target. The invention consists of a pair of antennas mounted on a moving missle or aircraft which is guided on a path toward the target and the antennas are spaced apart one half the expected wave length of the transmitted signal from the surface or ground transmitter or one half the wave length of the expected reflected signal from the target. The signals received by the antennas are fed to what is commonly referred to as a hybrid junction and are applied to alternate arms of the hybrid junction. The remaining arms of the hybrid junction are equipped with detection devices suitable to the frequency and modulation characteristics of the received signals. The output from the detection devices are applied to a common circuit wherein the combined output is amplified and applied to a multivibrator, counter, and blocking oscillator circuitry to provide a positive pulse to the control grid of a thyratron. The thyratron has a second grid which can be pulsed by a gate from a separate timing circuit to provide a firing signal for a missile warhead or a bomb.

As can readily be seen, the present invention has many advantages over the prior CPA indicators mentioned above in that its simplicity and construction is a great advantage over the CPA indicators which were based on the principle of the Doppler effect. Also the present invention can discriminate between targets by pulse repetition rate selection as well as carrier frequencies selection and its accuracy is relatively independent of reflectivity of targets when used as an active device or relatively independent of the transmitted power when applied as either an active or a passive system. Furthermore, the counter in the present system makes it possible to increase the stability of the CPA indicator so that spurious noise or pulses will have minimum effect and the angle of operation can be selected prior to attack by phase shifting between the hybrid junction and the antennas.

It is an object of the invention, therefor, to provide a method for determining the closest point of approach of a missile or aircraft with a distant transmitter or target.

It is a further object of the invention to provide a CPA indicator which can discriminate between targets by pulse repetition rates selection as well as carrier frequency selection.

Another object of the invention is to provide a CPA indicator whose accuracy is relatively independent of reflectivity of target when used as an active device.

It is a further object of the invention to provide a CPA indicator wherein spurious noise or pulses will have mimimum effect on the system.

Another object of the invention is to provide a CPA indicator system for a missle warhead which can discriminate against transmitters of the wrong radio frequency.

It is a still further object of the invention to provide a warhead detonation circuit for a guided missle which can determine the closest point of approach between an enemy radio transmitter and a missle when either the missle or the transmitter, or both, are moving along straight line courses.

A further object of the invention is to provide a closest point of approach system which can be used as a direction indicator to indicate when the transmitter is at right angles to the antenna alignment of the CPA indicator.

Other objects and many of the attendant advantages of this invention will be readily appreciated as the same becomes better understood by reference to the following detailed description when considered in conjunction with the accompanying drawings wherein.

Figure 1:
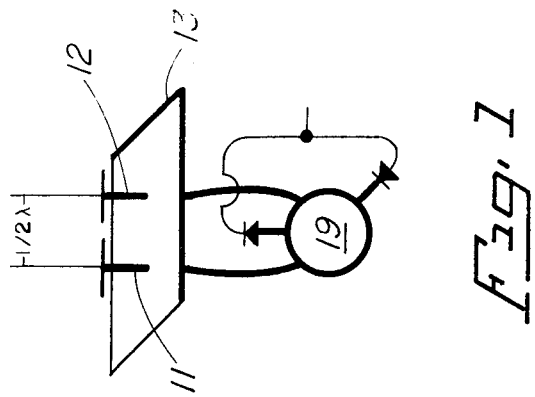
FIG. 1 is a schematic pictorial view of the antennas, hybrid junction and detectors associated with the missle skin or aircraft surface.
Figure 2:
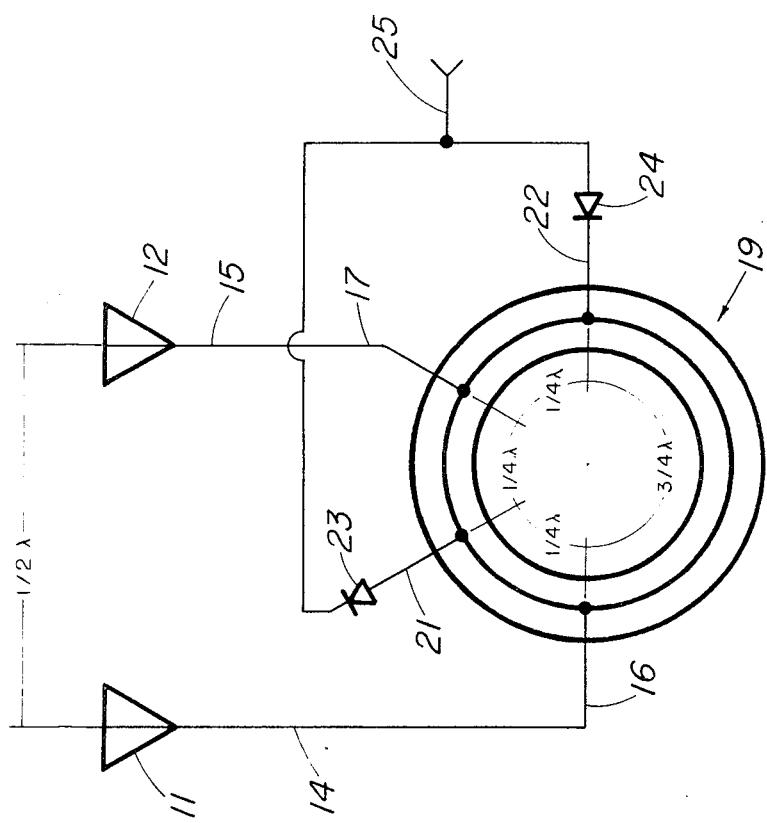
FIG. 2 is a schematic wiring diagram of the antennas, hybrid jucntion and detectors.

Referring to FIGS. 1 and 2 the antennas and hybrid junction arrangement disclosed are typical arrangements used in the practice of the present invention and include a pair of antennas 11 and 12 spaced apart one half the wave length λ of the expected received signal. As shown in FIG. 1 the antennas 11 and 12 are of the typical diopole type and are mounted on the exterior of a missile aircraft surface 13. The energy received by the antennas 11 and 12 is fed by equal length transmission lines 14 and 15 respectively into alternate arms 16 and 17 of the hybrid junction 19. The other pair of alternate arms 21 and 22 of the hybrid junction 19 are provided with detection devices suitable to the frequency and modulation characteristics of the received signal such as the crystal diodes 23 and 24. The polarity of the crystal dectectors 23 and 24 are reversed from each other as shown in FIG. 2 and the outputs are added together in a simple "T" connection 25 where they are fed to a fuze system firing circuit as hereinafter described.

In operation of the divice shown in FIGS. 1 and 2 it is best to consider the operation when the device has received signals which are in phase and in the example when the device has received a signal 180° out of phase. In the first instance when the two antennas 11 and 12 are excited by a transmitter signal or a target reflected signal in pahse the waves will be applied to the hybrid junction 19 and under this condition the waves will add in the arm 21 but will subtract in the arm 22 since the arms 16 and 17 by which the signal received by the antenna 11 of the antenna 12 are each a quarter wave length from the arm 21 of the hybrid junction while the arm 16 is three quarters of a wave length from the arm 22 and the arm 17 is one quarter of a wave length from the arm 22. Since the gains of the antenna 11 and 12 are equal, practically all of the signal will appear in the arm 21 and practically none will appear within the arm 22. The resultant detected output from the crystals 23 and 24 will, therefore, be positive from the output of the crystal 23 and is applied to the T connection 25 to be fed to a fuze firing circuit hereinafter described.

In the case where the signals received by the antenna 11 and 12 are 180° out of phase and are applied through the equal length transmission lines 14 and 15 to the hybrid junction 19, practically all of the signal will appear in the arm 22 as an output through the detector 24 and none would appear in the arm 21 whereby a negative detected output will result at the T connection 25. Since the applied signals to the arms 16 and 17 will cancel at their junction with the arm 21 while the signals from the arms 16 and 17 will add at their connection with the arm 22 and produce a negative detected signal through the crystal detector 24, and since there is no positive signal from the detector 23 to the arm 21, the output from the T connection will be a negative pulse.

Figure 3:
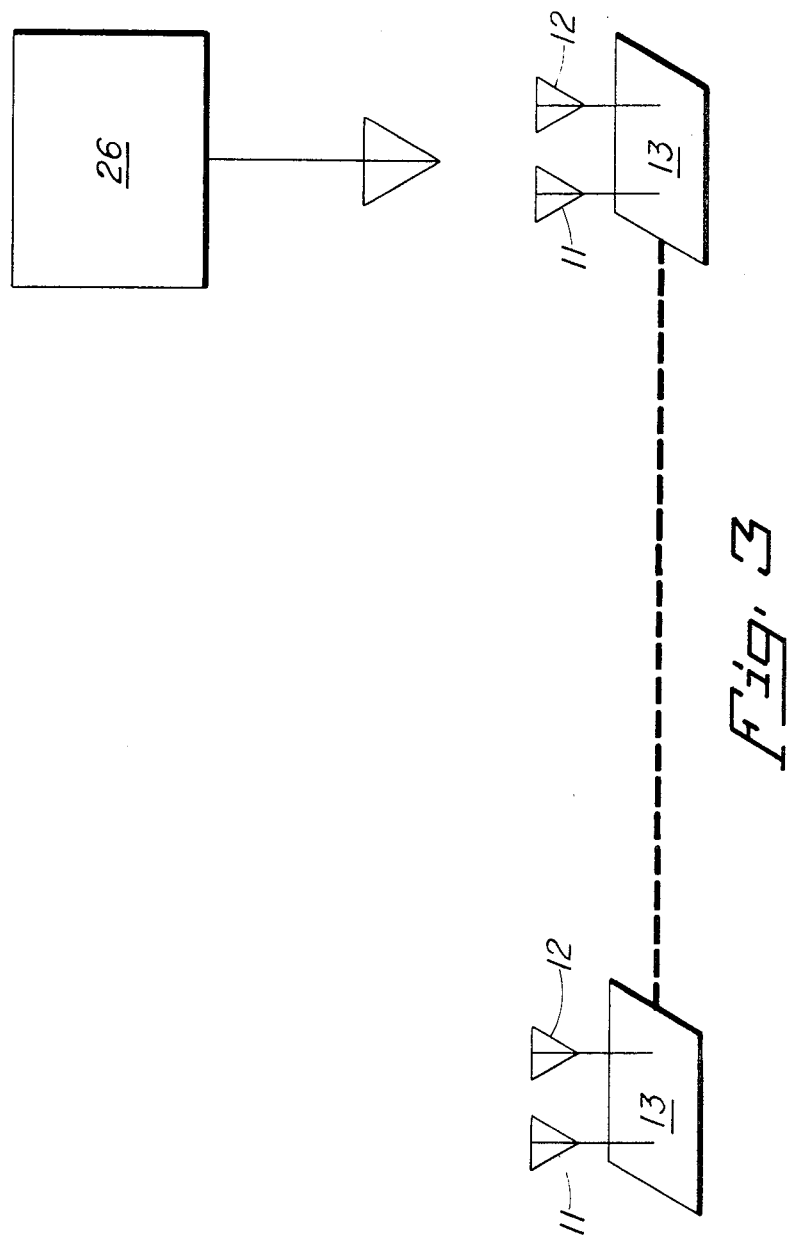
FIG. 3 is a schematic diagram illustrating the relationship of the pair of antennas at the instant the invention passes by a target or transmitter.

With reference to FIG. 3 wherein the schematic sketch illustrates the two extreme positions of the antennas 11 and 12 with the relation to a traget or enemy transmitter 26 it can readily be seen how the antenna arrangement 11-12 in conjunction with the hybrid junction 19 can be used to indicate the closest point of approach of a missle or aircraft as it passes the enemy transmitter or target. When the antennas 11 and 12 are at the maximum range position from the enemy transmitter or target 26 as shown on the left in FIG. 3 the antennas are aligned in tandem with their common axis directed at the transmitter or target 26 and will be excited one-half wave length or 180° out of phase and a negative detected signal will result from the hybrid junction 19, the crystal detectors 23, 24 and T connection 25. As the antennas 11 and 12 on the missile or aircraft surface 13 approach the transmitter or target 26 along a straight line course the two antennas 11 and 12 become more and more excited in phase and just as they pass by the transmitter 26 (that is the position shown on the extreme right in FIG. 3) they will be excited exactly in phase and at this point the missle or aircraft has passed the transmitter or traget 26 at the closest point of approach and a maximum positive detected signal will result from the T connection 25.

Figure 4:
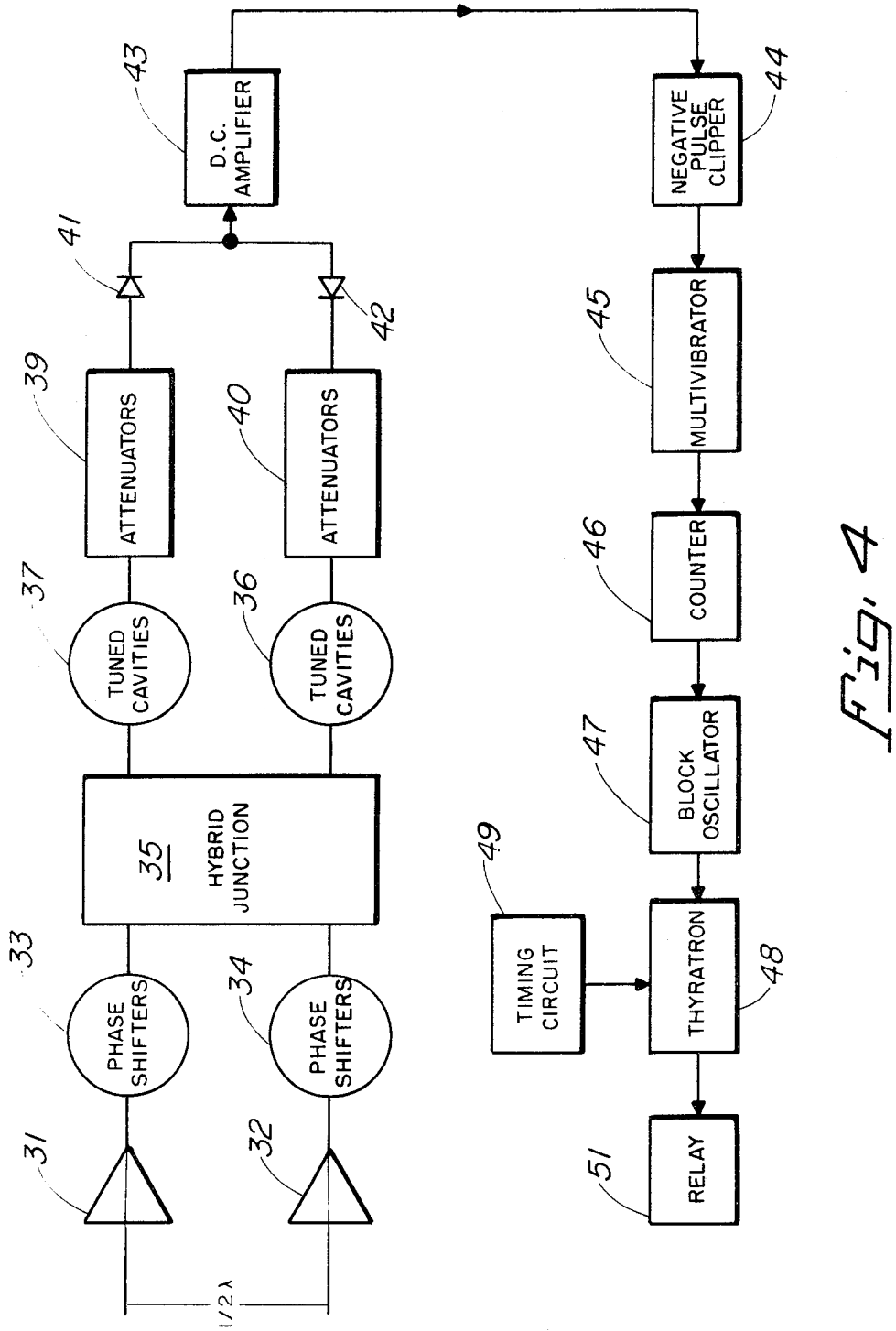
FIG. 4 is a block diagram of one preferred embodiment of the present invention when used in a missile or bomb fuze system.

In using the device above described and illustrated in FIGS. 1, 2 and 3 in a fuzing system one preferred embodiment of such a system showing various improvements designed to increase the accuracy of the determination of the closest point of approach is illustrated in FIG. 4 and includes a pair of antennas 31–32 spaced apart one half the wave length λ of the expected signal transmitted from an enemy transmitter or one half the wave length of the expected reflected signal from a target. In this system, unlike the system shown in FIGS. 1, and 2, a pari of phase shifters 33 and 34 receive the signal from the antennas 31 and 32 respectively and change the relative phases of the signal before entering the hybrid junction 35, thereby changing the relative positions of the enemy transmitter and the antennas 31–32 which will result in complete addition or subtraction of the signals in the hybrid junction.

The output from the hybrid junction 35 through alternate arms (not shown but which would be equivalent to the arms 21 and 22 of FIG. 2). is applied to tuned cavities 36 and 37 which act as filters to discriminate against transmitted or reflected signals from targets which are of the wrong radio frequency.

The outputs from the tuned cavities 36 and 37 are applied respectively to the crystal detectors 42 and 41. The polarity of the crystals 42 and 41 are reversed from each other, as in the case the detectors 23 and 24 in FIGS. 1 and 2, whereby the detected outputs of the detectors 41 and 42 are added together in a T connection before being applied to the DC amplifier 43. A pair of attenuators 39 and 40 are provided between the output of the tuned cavities 36 and 37 and the crystal diodes or detector 42 and 41 in order to change the relative sensitivity of the system to in phase and out of pahse signals and it is to be understood, of course, that the attenuators 39 and 40 could be placed before or after the crystals 41 and 42 in order to achieve this desired effect. The sensitivity of the system is increased by use of the attenuators 39 and 40 because, if the positive signals from the detector 41 is attenuated before being added to the negative signals from the detector 42, for example, the antennas 31 and 32 outputs will have to be more nearly in phase before the positive signals will become larger than the negative signals, hence the system described will have to be more nearly located at the exact closest point of approach before a resultant positive signal output can be obtained at the T connection.

The remaining parts of the fuze system shown in FIG. 4 are an arrangement that can be made to increase the accuracy of the determination of the closest point of approach system when operating against pulse radio signals of a pulse radar set. When the pulse signals are received by the antennas 31 and 32 and applied to the hybrid junction 35 and to the crystal detectors 41 and 42, the positive or negative pulses from the T connection of the diodes 41 and 42 are amplified without differentiation by the DC amplifier 43. The output from the DC amplifier 43 is then fed to a negative pulse clipper 44 which allows only positive pulses to pass and to trigger the multivibrator 45. The multivibrator 45 generates constant amplitude, constant duration pulses which are fed to the counter circuit 46 that is designed in a manner which will require a minimum pulse repetition frequency for a certain mimimum interval of time before a pulse is fed to the blocking oscillator 47. When triggered the blocking oscillator 47 generates a positive pulse which is applied to the control grid of the thyratron 48. The thyratron 48 is of the conventional type which contains an extra control grid called a shield grid which is pulsed by a gate from a separate timing circuit 49, such as a tracking gate in a radar set. When the blocking oscillator 47 and the gate from the timing 49 are applied simultaneously to the thyratron 48 the thyratron fires and closes a relay 51 which in turn completes the firing circuit of a bomb or detonation circuit of a fuze.

By combining the conventional circuitry of the individual parts shown in FIG. 4 a novel fuze triggering device is provided which has many new advantages. For example, the phase shifters 33 and 34 can alter the positions of the enemy transmitter with respect to the disclosed system which will result in complete addition or subtraction of the signals in the hybrid junction and the tuned cavities can discriminate against enemy transmitters of the wrong radio frequency. Furthermore the attenuators 39 and 40 can reduce the number of relative positions of the closest point of approach system and the enemy transmitter which may give an indication of the CPA thereby improving the accuracy of the determination. Large signals of the wrong phase, negative detected pulses, for example, are prevented from closing the relay 51 even though they are amplified by the DC amplifier 43 because the negative pulse clipper 44 and the normal tendency of the multivibrator 45 to reject negative pulses will not actuate the counter 46 and thus blocking oscillator 47 cannot trigger the thyratron 48 simultaneously with the gate pulse from the timing circuit 49.

Although the circuitry shown in FIG. 4 is the preferred embodiment of the invention used against pulse type radar systems it is to understood that other systems within the scope of the invention can be used. For example, the crystal detectors 41 and 42 and their appropriate circuitry can be changed by using other voltage or power detection devices such as barreters, bolometers, thermisters and bridge circuits may be used if a power detection instead of voltage detection devices are employed, Also crystals of the same polarity can be used if the bridge circuit is used.

Obviously many modifications and variations of the present invention are possible in the light of the above teachings, it is to be understood that within the scope of the appended claims the invention may be practiced otherwise than as specifically described.

What is claimed is:

1. A radio fuze system for determining the closest point of approach of a missile to a target comprising a pair of stations for receiving radio signals from said target, means for comparing the phase relationship between said signals including means for algebraically adding said signals to produce an output, means for amplifying said output and means for deriving a firing signal for said fuze when said missile attains said closest point of approach; said amplifying means including means for amplifying the DC component of said output and said means for deriving a firing signal including means for deriving a first pulsed signal from said DC amplifying means output and means for deriving a second pulsed signal whereby said firing signal occurs only when said pulsed signals are derived simultaneously.

2. The radio fuze system of claim 1 in which said comparing means includes a hybrid junction, means connecting said pair of stations to alternate arms of said hybrid junction and said means for algebraically adding said signals comprises a pair of crystal detectors connected to other alternate arms of said hybrid junction, said detectors having their polarity reversed with respect to each other whereby said output consists of a signal with a predetermined polarity when said received signals are in phase.

3. A radio fuze system for determining the closest point of approach of a missile to a target comprising a pair of stations for receiving radio signals from said target, means for comparing the phase relationship between said signals including means for algebraically adding said signals to produce an output means for amplifying said output amd means for deriving a firing signal for said fuze when said missile attains said closest point of approach; said amplifying means including means for amplifying the DC component of said output and said means for deriving a firing signal including means for deriving a first pulsed signal from said DC amplifying means output and means for deriving a second pulsed signal whereby said firing signal occurs only when said pulsed signals are derived simultaneously; said means for deriving said first pulsed signal comprising a negative pulse clipper connected to said DC amplifier output whereby the negative DC signals are eliminated, a multivibrator connecting said negative pulse clipper and a counting means whereby the positive signals of said DC amplifier actuate said multivibrator to produce pulses of constant amplitude and duration and said counting means generates a pulse output only after receiving a predetermined number of pulses from said multivibrator, a blocking oscillator connecting said counting means and a thyratron whereby said pulse output of said counting means triggers said blocking oscillator to control said thyratron.

4. A radio fuze system for determining the closest point of approach of a missile to a target comprising a pair of stations for receiving radio signals from said target, means for comparing the phase relationship between said signals including means for algebraically adding said signals to produce an output means for amplifying said output and means for deriving a firing signal for said fuze when said missle attains said closest point of approach; said amplifying means including means for amplifying the DC component of said output and siad means for deriving a firing signal including means for deriving a first pulsed signal from said DC amplifying means output and means for deriving a second pulsed signal whereby said firing signal occurs only when said pulsed signals are derived simultaneously; said means for deriving said first pulsed signal comprising a negative pulse clipper connected to said DC amplifier output whereby the negative DC signals are eliminated, a multivibrator connecting said negative pulse clipper and a counting means whereby the positive signals of said DC amplifier actuate said multivibrator to produce pulses of constant amplitude and duration and said counting means generates a pulse output only after receiving a predetermined number of pulses from said multivibrator, a blocking oscillator connecting said counting means and a thyratron whereby said pulse output of said counting means triggers said blocking oscillator to control said thyratron; said means for deriving a second pulse signal comprising a timing circuit connected to said thyratron whereby said timing circuit and said blocking oscillator outputs actuate said thyratron to produce said firing signal.

* * * * *